United States Patent [19]

Schauffele et al.

[11] 3,769,598

[45] Oct. 30, 1973

[54] GAIN CONTROL CIRCUIT

[75] Inventors: Carl N. Schauffele, Rochester; Harry L. Valenta, North Chili, both of N.Y.

[73] Assignee: Eastman Kodak Company, Rochester, N.Y.

[22] Filed: Oct. 15, 1971

[21] Appl. No.: 189,675

[52] U.S. Cl. .................. 328/185, 328/147, 328/151, 328/181, 307/228, 307/230

[51] Int. Cl. .................. H03k 4/08

[58] Field of Search .................. 328/151, 181, 185, 328/147, 149; 307/228, 230

[56] References Cited

UNITED STATES PATENTS

| | | | |
|---|---|---|---|
| 3,541,320 | 11/1970 | Beall | 328/151 X |
| 3,577,012 | 5/1971 | Bummermuth | 328/181 X |
| 3,617,769 | 11/1971 | Hanson | 328/181 X |
| 3,639,824 | 2/1972 | Malavasi | 328/151 X |
| 3,701,993 | 10/1972 | Geeling | 328/185 X |

*Primary Examiner*—John S. Heyman
*Attorney*—William H. J. Kline et al.

[57] ABSTRACT

A method and apparatus for regulating the rate of change of first and second sawtooth waveform signals. First and second, 180° out-of-phase, sawtooth waveform signals are generated by sawtooth waveform signal generating circuits in response to first and second trigger signals, each of the sawtooth waveform signals having a frequency equal to the first frequency of the first and second signals. The instantaneous amplitudes of the first and second sawtooth waveform signals are alternately applied, in response to second and first trigger signals, respectively, to a rate of change regulating circuit for the first and second sawtooth waveform signal generating circuits, the rate of change regulating circuit including an integrating circuit for comparing the instantaneous amplitudes with a reference amplitude and storing the instantaneous amplitudes of the sampled first and second sawtooth waveform signals to produce a control signal that is integrated by the first and second sawtooth waveform signal generating circuits to generate the first and second sawtooth waveform signals.

15 Claims, 2 Drawing Figures

GAIN CONTROL CIRCUIT

CROSS REFERENCE TO RELATED APPLICATIONS

Reference is made to commonly assigned, copending U.S. Pat. application Ser. No. 60,493, entitled FILM SCANNING FOR TELEVISION REPRODUCTION, filed Aug. 3, 1970 in the names of Lenard M. Metzger and David L. Babcock.

BACKGROUND OF THE INVENTION

1. Field of the Invention

This invention relates to apparatus for generating a complex sawtooth waveform signal for use in film reproduction television apparatus, and more particularly, to a gain control circuit for regulating the gain of signal generating circuits.

2. Description of the Prior Art

In apparatus of the type described in the aforementioned U.S. Pat. application Ser. No. 60,493, a flying spot scanning device is used to scan the frames of a motion picture film with a beam of light in the standard interlace scanning pattern. The beam of light is modulated by the image pattern on the film frame, and the modulated light is detected and transformed into an NTSC video signal by optical-to-electrical signal transducer apparatus. The video signal may be used to control the intensity of the electron beam of a television receiver, and thus the reproduction of the motion picture film frame on the television screen. Since the motion picture film is moved relative to the beam of light produced by the flying spot scanning device at a frame rate less than the field scanning rate for the spot scanning device, the scanning beam is deflected in the direction of movement of the film at the beginning of each frame. Therefore, the frame area of the film scanned remains constant for each scanning field.

In the aforementioned U.S. Pat. application Ser. No. 60,493, means are provided to continuously move the motion picture film past a scanning station at the nominal rate at which the image frames are recorded on the motion picture film. A sensing device detects the actual rate of movement of the film frames and generates a first signal having a first frequency rate related to the rate of movement of the motion picture film. The first signal is applied to a vertical deflection circuit including logic circuitry for producing, alternately, first and second trigger signals in response to alternate pulses of the train of pulses of the first signal. The first and second trigger signals are applied to first and second sawtooth waveform signal generators to control the production of respective first and second, 180° out-of-phase, sawtooth waveform signals, each of the sawtooth waveform signals having a second frequency equal to an integral submultiple of the first frequency of the first signal. In the preferred embodiment of the invention disclosed in the aforementioned copending U.S. Pat. application Ser. No. 60,493, the second frequency of each sawtooth waveform signal is equal to one-half the first frequency of the first signal.

In the aforementioned U.S. Pat. application Ser. No. 60,493, the first and second sawtooth waveform signals are continuously applied to differential amplifiers which compare the instantaneous difference between the amplitudes of the first and second sawtooth waveform signals with a reference amplitude for regulating the gain of the first and second sawtooth waveform signal generating circuits. The differential amplifier gain control circuit disclosed in the aforementioned U.S. Pat. application Ser. No. 60,493 incorporates first and second differential amplifiers and complex filter circuits for detecting long term and short term variations in the difference between the amplitudes of the first and second sawtooth waveform signals. Because the polarity of the difference signals applied to the filter circuits reverses at each occurrence of the trigger signal, the gain control circuit is very complicated to prevent instability. Furthermore, due to their construction, the first and second sawtooth waveform signal generating circuits tend to be unstable under some conditions which reduce the effectiveness of the vertical deflection circuit to consistently control the deflection of the flying spot scanner with respect to the actual movement of the film through the scanning station of the telecine apparatus.

SUMMARY OF THE INVENTION

Accordingly, it is an object of the present invention to increase the stability and accuracy of complex sawtooth waveform signal generating circuits for telecine apparatus.

Another object of the invention is to more accurately regulate the gain of sawtooth waveform signal generating circuits.

A further object of the invention is to provide a method and apparatus for generating and regulating the rate of change and maximum amplitude level of output signals having linearly changing sawtooth waveforms.

In accordance with these and other objects of the present invention a method and apparatus is disclosed for regulating the rate of change and maximum level of an output signal having a linearly changing waveform established in accordance with a first signal having a first frequency of occurrence in response to a second signal having a second frequency of occurrence and a reference signal having a first reference level by detecting the instantaneous level of the linearly changing waveform of the output signal at each occurrence of the second signal, comparing the instantaneous level of the output signal with the first reference level of the reference signal and producing a control signal having a control level, storing the control level of the control signal during the period between successive occurrences of the second signal, integrating the control level of the control signal during the period between successive occurrences of the first signal to produce the output signal, the output signal having a rate of change dependent upon the control level of the control signal, and adjusting the level of the linearly changing waveform of the output signal to a second reference level at each occurrence of the first signal, whereby the waveform of the output signal linearly changes in response to the control level of the control signal from the second reference level to maximum level in the period between successive occurrences of the first signal. In accordance with the preferred embodiment of the invention, the output signal has a linearly changing sawtooth waveform, the first and second frequencies of the first and second signals are equal, the second signal is 180° out-of-phase with respect to the first signal, and the first reference level is one-half the maximum level of the sawtooth waveform output signal.

Furthermore, a method and apparatus is disclosed for regulating the slope and maximum level of first and second sawtooth waveform signals generated in response to the first and second signals, respectively, wherein the levels of the first and second sawtooth waveform signals are detected, alternately, by the second and first signals, respectively, and are compared with the first reference level to produce the control signal. The control level of the control signal is integrated by first and second integrating means, reset periodically by the first and second signals, respectively, to produce the first and second sawtooth waveform signals. The disclosed gain control method and apparatus advantageously stabilizes the vertical deflection signal derived from the first and second sawtooth waveform signals.

The invention, and its objects and advantages, will become more apparent in the detailed description of the preferred embodiment presented below.

DESCRIPTION OF THE PREFERRED EMBODIMENT

Figure 1:
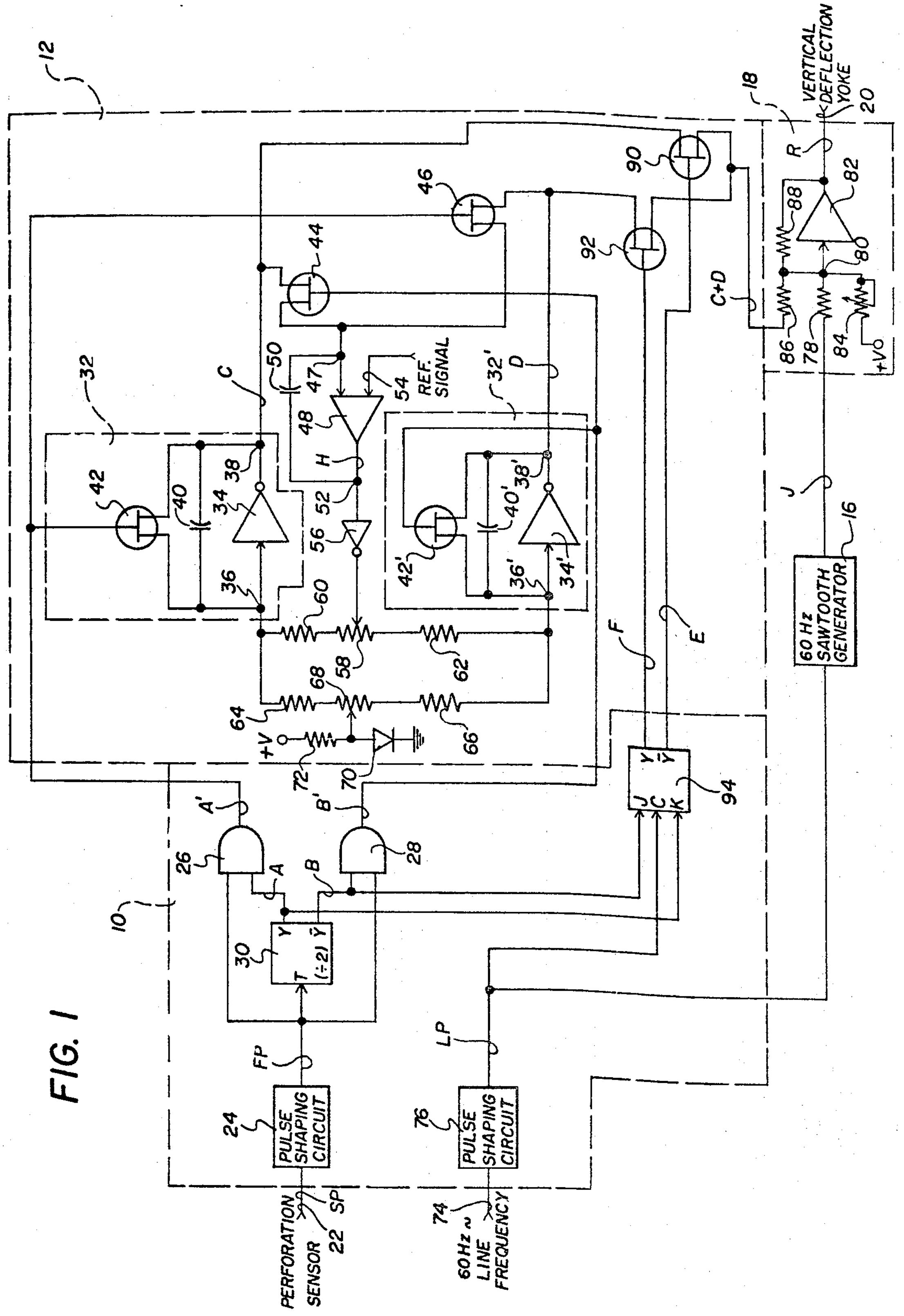
FIG. 1 is a schematic illustration in block diagram and in discrete component form of a vertical deflection circuit suitable for use in the telecine apparatus disclosed in FIG. 1 of U.S. Pat. application Ser. No. 60,493.

In aforementioned copending U.S. Pat. application Ser. No. 60,493, the telecine apparatus in which the preferred embodiment of the present invention is to be employed is shown in greater detail. Briefly, the telecine apparatus includes a flying spot scanning system for converting image frames on a continuously moving motion picture film into video signal frames suitable for television transmission or direct application to a television receiver. The flying spot scanning system includes a cathode ray tube which produces a light beam that is deflected over the film frame area under the control of a horizontal and vertical deflection circuit. The vertical deflection circuit develops a vertical deflection signal having a complex sawtooth waveform for controlling the vertical deflection of the flying spot scanner in response to a first input signal developed by a film perforation sensor and a second signal developed from the standard 60 Hz. a.c. power line frequency. The first signal constitutes a train of pulses developed by the perforation sensor having a first frequency of repetition equal to the frame rate of movement of the continuously moving motion picture film through the scanning station of the flying spot scanning system.

The beam of light generated by the cathode ray tube under the control of the horizontal and vertical deflection circuits passes through the film frame and is directed upon optical-to-electrical signal transducer apparatus for converting the optical image of the film frame into NTSC color video field signals for transmission or direct application to a color television receiver for reproduction of the scanned image frames at the standard 60 Hz. television field rate frequency. As described in the aforementioned U.S. Pat. application Ser. No. 60,493, the vertical deflection circuit is designed to produce a complex sawtooth waveform, vertical deflection signal suitable to control flying spot scanning at 60 television fields per second of any integral or non-integral motion picture film frame rate of movement. For example, the vertical deflection circuit develops a complex sawtooth waveform signal having a 60 Hz. frequency that automatically scans three times each frame of a motion picture film moved through the telecine apparatus at a frame rate of 20 frames per second. For all the frames rates between 20 and 30 frames per second, film frames are scanned two or three times. For all the frame rates between 10 and 20 frames per second, each film frame is scanned either three or four times. For frame rates between 0 and 10 frames per second, the film frames are scanned from 60 to 6 times per second. Furthermore, the vertical deflection circuit is designed to automatically compensate for changes in the positioning of film frames on the motion picture film with respect to each other and for changes in the rate of movement of the film frames. The speed and accuracy of the vertical deflection circuit in following the rate of movement of the film frames is highly important to the successful operation of the telecine apparatus. Failure of the vertical deflection circuit to accurately track the moving film frames may contribute to an unsteady picture displayed by the color television receiver.

Referring now to the drawings and first to FIG. 1, as one preferred embodiment of the invention, there is shown a novel vertical deflection circuit including a logic circuit 10, a sawtooth waveform signal generating circuit 12, a 60 Hz. sawtooth waveform signal generator 16, and a vertical deflection amplifier 18, the output terminal 20 of which is applied to the vertical deflection yoke of the cathode ray tube of the telecine apparatus disclosed in the aforementioned U.S. Pat. application Ser. No. 60,493. The operation of the vertical deflection circuit of FIG. 1 is explained with reference to the exemplary waveform diagrams of FIG. 2, the notation of which relate to the signals developed at specific points in the block diagram of FIG. 1 at a frame rate of movement of 24 frames per second.

Figure 2:
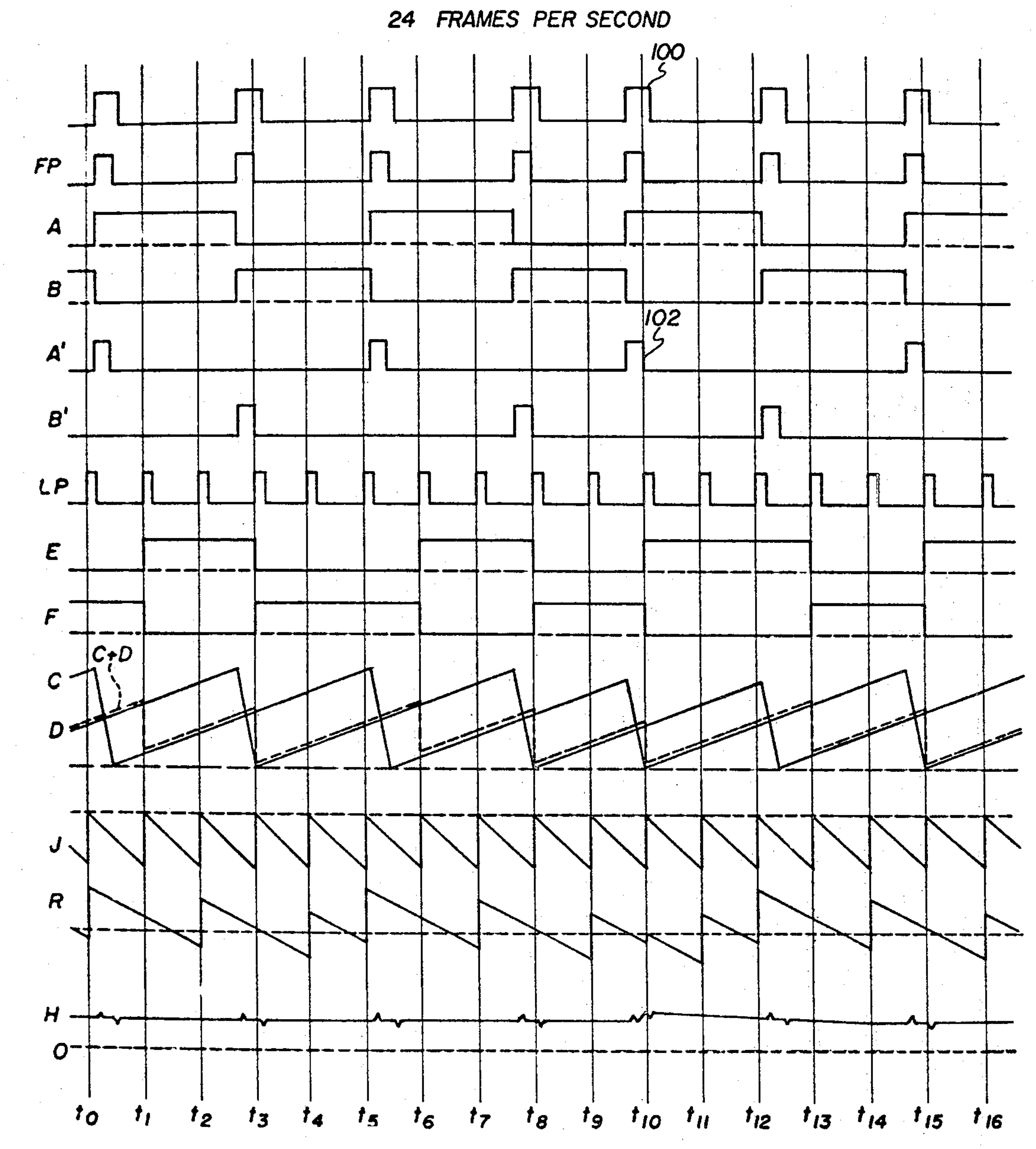
FIG. 2 is a view showing the waveforms of various signals developed at particular points in the vertical deflection circuit of FIG. 1.

The logic circuit 10 of FIG. 1 includes a first input terminal 22 connected to the output of a perforation sensor for receiving the first signal SP and applying it to the pulse shaping circuit 24. The output signal FP of the pulse shaping circuit 24 is applied to the first input terminal of AND gate 26 and 28 and to the Trigger T input terminal of the first bistable multivibrator 30. As shown in FIG. 2, the first bistable multivibrator 30 divides by 2 the frequency of the first signal SP and develops the half frame rate frequency, complementary squarewave signals A and B at the output terminals Y and $\overline{Y}$ of the first bistable multivibrator 30. The half frame rate frequency signals A and B are applied to the second input terminals of the AND gates 26 and 28. The AND gates 26 and 28 respond to the half frame rate frequency signals A and B, respectively, shown in FIG. 2 and to the ouptut signal FP to develop the first and second, half frame rate frequency, trigger signals A′ and B′. Thus the logic circuit 10 as described produces first and second, half frame rate frequency, trigger signals A′ and B′ in response to the train of pulses constituting the first signal SP.

The first and second trigger signals A′ and B′ are applied to the first and second sawtooth waveform signal generating circuits 32 and 32′. The circuit 32 includes an operational amplifier 34 having an input terminal 36 and an output terminal 38, a capacitor 40 connected in parallel with the operational amplifier 34 to the input terminal 36 and the output terminal 38, and a field effect transistor (FET) gate 42 connected in parallel with capacitor 40 and the operational amplifier 34 to the input terminal 36 and the output terminal 38. The FET gate 42 is normally nonconductive when the positive going pulse of the first trigger signal A′ is not present at its gate electrode. Therefore, in the absence of a positive going pulse of the first trigger signal A′, the operational amplifier 34 is operative in conjunction with the capacitor 40 to invert the polarity of the current signal applied to the input terminal 36 and to integrate the current signal, over the period of time between succeeding positive going pulses of the first trigger signal A′, through the charging action of the capacitor 40. Thus, as shown in FIG. 2, during the time interval between times $t_3$ and $t_8$, the current signal applying to the input terminal 36 is inverted by the operational amplifier 34, and the inverted current signal at the output terminal 38 linearly charges the capacitor 40. As the capacitor 40 charges, the first linearly changing sawtooth waveform signal C shown in FIG. 2 develops at the output terminal 38. Upon each occurrence of the first trigger signal A′, the field effect transistor 42 is rendered conductive to discharge the voltage stored by the capacitor 40 to ground potential. In like manner, the similarly numbered elements of the second sawtooth waveform signal generating circuit 32′ develop the second sawtooth waveform signal D during the time intervals between the positive going pulses of the second trigger signal B′.

As shown in FIG. 2, the first and second sawtooth waveform signals C and D have positive going polarities and linearly changing waveforms. The employment of the operational amplifiers 34 and 34′, and the capacitors 40 and 40′ insures that the positive going slope or rate of change of the first and second sawtooth waveform signals is extremely linear. The FET gates 42 and 42′ are operative, when rendered conductive, to consistently discharge the capacitors 40 and 40′ to ground potential in the time period of the positive going pulses of the first and second trigger signals A′ and B′. The fact that the sawtooth waveforms of the first and second sawtooth waveform signals C and D are positive in polarity indicates that the current input signal applied to the input terminals 36 and 36′ is negative in polarity. It will be apparent that the first and second sawtooth waveform signal generators 32 and 32′ could as well produce first and second sawtooth waveform signals C and D that are negative in polarity in response to positive current input signals applied to the input terminals 36 and 36′. Similarly, it will be apparent that the pulses of the first and second trigger signals A′ and B′ could be negative in polarity, and that the FET gates 42 and 42′ could be selected to be rendered conductive in response to negative pulses of the first and second trigger signals A′ and B′. For sake of convenience, the symbol employed for the FET gates 42 and 42′ is generalized, and it will be apparent that any FET type may be employed, with proper biasing, to perform the discharge function for the capacitors 40 and 40′ in view of the polarity of the trigger signals A′ and B′ and the polarity of the voltage stored by the capacitors 40 and 40′. Also, for sake of convenience, the conventional biasing of the operational amplifiers 34 and 34′ have been left out of FIG. 1.

As described in greater detail hereinbelow, the first and second sawtooth waveform signals C and D are selectively and alternately combined with the third sawtooth waveform signal J of FIG. 2 which is negative in polarity and has a frequency of 60 Hz., the NTSC television field rate frequency in use in the United States, to produce the vertical deflection signal R which has a complex sawtooth waveform signal that repeats, in the example of 24 frames per second shown in FIG. 2, every five fields. Since the standard vertical deflection signal J has a constant slope sufficient to vertically scan the stationary film frame, the slope of the first and second sawtooth waveform signals C and D determines the resultant slope of the complex sawtooth waveform of the vertical deflection signal R. The slope of the vertical deflection signal R over the television field period insures that the scanning raster pattern is compressed in amplitude in an amount sufficient to control the deflection of the scanning beam over a continuously moving film frame which effectively expands the compressed raster pattern to cover the film frame. The instantaneous amplitudes (governed by the slope) of the first and second sawtooth waveform signals C and D also control the position of the scanning beam at the beginning of each vertical deflection field with respect to the moving film frames. Therefore, the slopes of the sawtooth waveforms of the first and second sawtooth waveform signals C and D are representative of the instantaneous position of the motion picture film frames with respect to the scanning beam of the flying spot scanner. Accordingly, it is preferred that the slopes of the first and second sawtooth waveform signals C and D are regulated as a function of the rate of movement of the motion picture film frames past the flying spot scanner.

The improved regulating circuit of the present invention for regulating the slope or rate of change of the first and second sawtooth waveform signals C and D in relation to the detected velocity of the moving film frames comprises first and second sampling FET gates 44 and 46 connected to the output terminals 38 and 38′ of the first and second sawtooth waveform signal generating circuits 32 and 32′ to pass the first and second sawtooth waveform signals C and D, respectively, to a common negative input terminal 47 of the operational amplifier 48 that are rendered conductive by each positive going pulse of the second and first trigger signals B′ and A′, respectively. The integrating capacitor 50 is connected across the negative input terminal 47 and the output terminal 52 of the operational amplifier 48. A reference signal is applied to the positive input terminal 54 of the operational amplifier 48. The output terminal 52 is connected through the inverter 56, the variable resistor 58, and the feedback resistors 60 and 62 to the input terminals 36 and 36′ of the operational amplifiers 34 and 34′, respectively. The gain control circuit establishes the level of the slope control current input signal applied to the input terminals 36 and 36′ of the operational amplifiers 34 and 34′, and the level of the slope control current input signal establishes the charging rate for the charge accumulated by the capacitors 40 and 40′. Therefore, the higher the level (in absolute terms) of the slope control current input signal, the faster the capacitors 40 and 40′ are charged by the operational amplifiers 34 and 34′. The slopes of the first and second sawtooth waveform signals C and D increase as the charging rate of the capacitors 40 and 40′ increase. The level of the slope control current input signal is established by the voltage charge accumulated by capacitor 50 at the output terminal 52 (shown as signal H in FIG. 2) in response to the sampled amplitudes of the first and second sawtooth waveform signals C and D applied to the negative input terminal 48 and in response to the reference amplitude of the reference signal applied to the positive input terminal 54 of the operational amplifier 48. Referring to FIG. 2, the first trigger signal A' resets the first sawtooth waveform signal C to zero at the time $t_5$, for example, and simultaneously, by rendering the second sampling FET gate 46 conductive, passes the second sawtooth waveform signal D to the negative input terminal 47 of the operational amplifier 48. The operational amplifier 48 subtracts the amplitude of the second sawtooth waveform signal D from the reference amplitude applied to the positive input terminal 54 of the operational amplifier 48, and the resulting difference signal H is accumulated by the capacitor 50. As shown in FIG. 2, the signal H is relatively steady over a period of time as the detected film frame rate remains relatively constant and the first and second sawtooth waveform signals C and D are sampled, alternately, by the second and first trigger signals B' and A', respectively. The signal H is inverted by the inverter 56 and is applied through the variable resistor 58 and the resistors 60 and 62 as the slope control current input signal to the input terminals 36 and 36' of the operational amplifier 34 and 34'.

The amplitude of the reference signal applied to the positive input terminal 54 of the operational amplifier 48 is selected so that the level of the slope control current input signal applied to the input terminals 36 and 36' of the operational amplifiers 34 and 34' is sufficient to produce, when integrated, maximum amplitudes of the first and second sawtooth waveform signals C and D that are equal to twice the amplitude of a vertical deflection signal which, when applied to the vertical deflection yoke of the flying spot scanner, is sufficient to deflect the scanning beam over a distance equal to twice a stationary film frame height. Thus, the reference signal amplitude is one-half the maximum amplitude of the sawtooth waveform signals C and D. The movement of the film at a stable rate produces the first and second sawtooth waveform signals C and D and the signal H which has an amplitude that reflects the actual rate of movement of the motion picture film frames. As the rate of movement decreases, the absolute amplitude of the signal H decreases, the current input signal decreases, and the slope of the first and second sawtooth waveform signals decreases, so that, over the period of time between successive pulses of the first and second trigger signals A' and B', the maximum amplitudes of the first and second sawtooth waveforms C and D remain constant at the reference signal level. Conversely, as the film frame rate of movement increases, the time periods between successive pulses of the first and second trigger signals A' and B' decrease, the signal level of the signal H increases, the current input signal increases in absolute value, and the slopes of the first and second sawtooth waveform signals C and D increase.

The variable resistor 58 is adjusted with respect to resistors 60 and 62 and the capacitors 40 and 40' so that the RC time constants of the first and second sawtooth waveform signal generating circuits 32 and 32' may be equalized. A further pair of resistors 64 and 66 are connected between a common variable resistor 68 and the input terminals 36 and 36'. The wiper arm of the variable resistor 68 is connected by diode 70 to ground potential and by resistor 72 to the positive voltage source + V. The wiper arm of the variable resistor 68 is set to equalize the bias currents of the operational amplifiers 34 and 34'. It will be apparent that other equalization schemes may be employed to equalize the response of the first and second sawtooth waveform signal generating circuits 30 and 32.

Referring now to FIG. 2 in greater detail, it will be apparent that during the time period from $t_0$ to $t_8$, the first signal SP is developed at a relatively constant frequency. However, after time $t_9$, the next succeeding pulse 100 of the first signal SP occurs earlier than it should have indicating that the rate of movement of the film has momentarily increased or that the distance between the perforations producing the pulses at times $t_8$ and $t_{10}$ has shrunk. In response to this aberration, the pulse 102 of the first trigger signal A' is produced earlier than it should be and the sampled amplitude of the second sawtooth waveform D is relatively lower than the previously sampled amplitude of the first sawtooth waveform signal C at the time $t_8$. Consequently, as shown at the time $t_{10}$, the amplitude of the different signal H increases. As the amplitude of the different signal H increases, the absolute amplitude of the current input signal applies to the input terminal 36 and 36' of the operational amplifier 34 and 34' increases and the slope of the first and second sawtooth waveform signals C and D tends to increase. As shown in FIG. 2, the succeeding pulses of the first signal SP return to the same frequency after time $t_{12}$ as they were before time $t_{10}$; therefore with the continued operation of the automatic gain control circuit of the invention, the amplitude of the signal H tends to normalize. The vertical deflection signal R shows a slight jump at times $t_{10}$ due to the fact that the first and second gating signals E and F switch in amplitude at time $t_{10}$ in response to the aberrant pulse 100 of the first signal SP. Therefore, the position of the flying spot scanner raster pattern is altered at time $t_{10}$ to track the corresponding film frame.

The sensitivity of the automatic gain control circuit may be varied over a wide range. It may be desirable to prevent any immediate adjustment in the positioning of the flying spot scanning raster in response to only a single aberration in the period between detected sprocket hole perforations. For example, wear of the sprocket holes may in deterioration of the leading or trailing edges of the sprocket holes detected by the perforation sensor, whereby the period of the first signal may be erratic. Also, the variations in the widths of successive sprocket hole perforations may influence the regularity of the period of the first signal SP when the trailing edge of the sprocket perforation is sensed by the perforation sensor. These deficiencies may be overcome by providing synchronizing indicia on the motion picture film in a predetermined relationship with each film frame and the indicia may be sensed to produce the first signal SP. In absence of such indicia however, it may be desirable to smooth the signal H over a period of several film frames to automatically regulate the slopes of the first and second sawtooth waveform signals C and D in response to long term changes in the film frame rate by varying the loop gain of the gain control circuit.

The remaining circuit elements of FIG. 2 operate in a manner very similar to those corresponding elements shown in the aforementioned, commonly assigned, copending U.S. Pat. application Ser. No. 60,493 to selectively combine alternate periods of the first and second sawtooth waveform signals C and D into the combined sawtooth waveform signal C + D, shown in the dotted line representation in FIG. 2, and to sum the combined sawtooth waveform signal C + D with the third sawtooth waveform signal J to produce the vertical deflection signal R having the complex resultant sawtooth waveform. Also, a single frame control circuit may be provided which is similar to the frame control circuit disclosed in the aforementioned commonly assigned copending U.S. Pat. application Ser. No. 60,493 to disconnect the combined sawtooth waveform signal C + D from the vertical deflection amplifier 18 when the first and second sawtooth waveform signals C and/or D increase in amplitude beyond the maximum amplitude, indicating that the production of the first signal SP has ceased.

Referring to the remaining elements of the circuit diagram of FIG. 1 in greater detail, the 60 Hz. line frequency is detected at the input terminal 74 of the logic circuit 10 and applied to a second pulse shaping circuit 76 which produces the second signal LP shown in FIG. 2 having a frequency of 60 Hz. The second signal is applied to the 60 Hz. sawtooth waveform signal generator 16 which generates the 60 Hz. vertical deflection sawtooth waveform signal J that is applied by resistor 78 to the summing input terminal 80 of the operational amplifier 82. A dc centering voltage source + V, is connected through variable resistor 84 to the summing input terminal 80 of the vertical deflection amplifier 82. The variable resistor 84 may be adjusted to center the scanning raster on the cathode ray tube of the flying spot scanner. The combined first and second sawtooth waveform signal C + D is applied through resistor 86 to the summing input terminal 80. The operational amplifier 82, in conjunction with the feedback resistor 88, sums the amplitudes of the signals provided to the summing input terminal 80 to produce the vertical deflection signal R at the output terminal 20 of the vertical deflection amplifier 18.

The combined first and second sawtooth waveform signal C + D is generated by the alternate conduction of the first and second FET gates 90 and 92 which are alternately rendered conductive by the high amplitude state of the gating signals E and F. The gating signals E and F are generated by the second bistable multivibrator 94 which is connected to receive at the J and K input terminals the second and first half-frame rate frequency signals B and A, respectively. The second signal LP as applied to the Clock C input terminal of the second bistable multivibrator 94. Therefore, as shown in FIG. 2, each positive impulse of the second signal LP that is applied to the C input terminal of the second bistable multivibrator 94 simultaneously with, or immediately succeeding in time, the application of a positive going pulse of the first or second half-frame rate frequency signal A or B switches the state of the Y and $\bar{Y}$ output terminals of the second bistable multivibrator circuit 94. Therefore, as shown in FIG. 2, the gating signals E and F are alternately high and low in amplitude with respect to each other and have respective periods that are integral multiples of the periods of the second signal LP. For example, the first and second half-frame rate frequency signals A and B switch polarity in response to the negative going transitions of the pulse FP in the interval between time $t_0$ and $t_1$. At the time $t_1$ the pulse of the second signal LP applied to the T input terminal of the second bistable multivibrator 94 responds to the high amplitude state of the K input terminal to switch the state of the $\bar{Y}$ output terminal to the high amplitude level and the state of the Y output terminal to the low amplitude level, whereby the high amplitude level of the gating signal E applied to the first FET gate 90 renders it conductive to pass that portion of the first sawtooth waveform C indicated by the dotted line noted by C + D in FIG. 2 to the summing input terminal 80 of the vertical deflection amplifier 18. Thus, as shown in FIG. 2, the combined first and second sawtooth waveform signals C + D is generated during successive integral periods of the 60 Hz. second signal LP.

By virtue of the fact that the amplitudes of the first and second sawtooth waveform signals C and D are alternately sampled only during short intervals, stored for the interval between successive pulses of the first and second trigger signals A′ and B′ and compared with the amplitude of a reference signal, the gain of the first and second sawtooth waveform signal generating circuits 32 and 32′ may be carefully regulated. These features of the automatic gain control of the present invention coupled with the employment of operational amplifiers and field effect transistors in the sawtooth waveform signal generating signal 12 represent a significant improvement in performance for the vertical deflection signal generating circuit of the present invention.

In summary, there is disclosed a novel vertical deflection signal generating circuit employing an automatic gain control circuit in conjunction with first and second sawtooth waveform signal generating circuits for producing a resultant vertical deflection signal having a complex sawtooth waveform for controlling the scanning of continuously moving motion picture film in direct dependence upon the detected rate of movement of the motion picture film. The vertical deflection signal generating circuit disclosed automatically adapts to a wide range of detected film frame rates, compensates for minor or major fluctuations in the spacing between film frames or in the frame rate of movement itself, and senses that a single stationary frame is to be scanned and automatically applies the proper vertical deflection signal to the flying spot scanner to scan the stationary film frame.

The invention has been described in detail with particular reference to the preferred embodiment thereof, but it will be understood that variations and modifications can be effected within the spirit and scope of the invention.

We claim:

1. Signal generating apparatus responsive to a first signal having a first frequency of occurrence for generating an output signal having the first frequency and a linearly changing waveform, and responsive to a second signal having a second frequency of occurrence and a reference signal having a first reference level for regulating the maximum level and the rate of change of the output signal, said signal generating apparatus comprising:

a. first means responsive to the second signal for detecting the instantaneous level of the linearly changing waveform of the output signal;

b. second means responsive to the detected instantaneous level of the output signal and the first reference level of the reference signal for producing a control signal having a control level related to the instantaneous level of the output signal and the reference level of the reference signal;

c. third means for integrating the control level of the control signal during the period between successive occurrences of the first signal to produce the output signal having a rate of change related to the control level of the control signal; and d. fourth means for adjusting the level of the linearly changing waveform of the output signal to a second reference level at each occurrence of the first signal, whereby the waveform of the output signal linearly changes in response to the control level of the control signal from the second reference level to the maximum level in the period between successive occurrences of the first signal.

2. The apparatus of claim 1 wherein the output signal has a linearly changing sawtooth waveform, said first and second frequencies are equal, the second signal is 180° out-of-phase with respect to the first signal, and the instantaneous level of the sawtooth waveform output signal detected by the first means in response to the second signal is one-half the maximum level of the sawtooth waveform output signal.

3. The apparatus of claim 1 wherein the output signal has a linearly changing sawtooth waveform, and said third means further comprises an input terminal, a reset terminal and an output terminal; and wherein said second means is coupled to said input terminal of said third means to apply the control signal to said input terminal; said third means is responsive to the control signal to produce the sawtooth waveform output signal at said output terminal; and said first means is coupled to said output terminal to detect the instantaneous amplitude of the sawtooth waveform output signal.

4. The apparatus of claim 3 wherein said third means further comprises a signal inverting operational amplifier having said input terminal and said output terminal and an integrating capacitor coupled to said input and output terminals and adapted to integrate the control signal applied to said input terminal, and inverted by said signal inverting operational amplifier, over the period corresponding to the first frequency of the first signal; and said fourth means further comprises a reset gate including said reset input terminal and having a predetermined signal conductive path coupled between said input terminal and said output terminal, whereby each occurrence of the first signal applied to said reset input terminal renders said reset gate conductive to discharge the integrating capacitor and to reset the sawtooth waveform output signal developed at said output terminal to said second reference level.

5. The apparatus of claim 4 wherein said first and second frequencies are equal, the second signal is 180° out-of-phase with respect to the first signal, and the instantaneous level of the sawtooth waveform output signal detected by the first means in response to the second signal is one-half the maximum level of the sawtooth waveform output signal.

6. The apparatus of claim 1 wherein said second means further comprises:

a. means for comparing the detected instantaneous level of the output signal with the first reference level of the reference signal to produce the control signal having the control level, said control level being related to the difference in amplitude between the first reference level and the detected instantaneous level and being representative of the second frequency of the second signal.

b. non-polar switching means responsive to the second signal to apply the instantaneous amplitude of the output signal to the comparing means; and c. means for storing the control level of the control signal during the successive periods of occurrence of the second signal.

7. A method of regulating the rate of change and the maximum level of an output signal having a linearly changing waveform established in accordance with a first signal having a first frequency of occurrence, in response to a second signal having a second frequency of occurrence and a reference signal having a first reference level, said method comprising the steps of:

a. detecting the instantaneous level of the linearly changing waveform of the output signal at each occurrence of the second signal;

b. comparing the instantaneous level of the output signal with the first reference level of the reference signal and producing a control signal having a control level related to the compared instantaneous level of the output signal and the first reference level of the reference signal;

c. integrating the control level of the control signal during the period between successive occurrences of the first signal to produce the output signal, the output signal having a rate of change related to the control level of the control signal; and d. adjusting the level of the linearly changing waveform of the output signal to a second reference level at each occurrence of the first signal, whereby the waveform level of the output signal linearly changes in response to the control level of the control signal from the second reference level to the maximum level in the period between successive occurrences of the first signal.

8. The method of claim 7 wherein the output signal has a linearly changing sawtooth waveform, the first and second frequencies of the first and second signals are equal, the second signal is 180° out-of-phase with respect to the first signal, and the first reference level is one-half the maximum level of the sawtooth waveform output signal.

9. The method of claim 7 further comprising the step of storing the control level of the control signal during the period between successive occurrences of the second signal.

10. Signal generating apparatus responsive to first and second signals differing in phase by 180° and each having a first frequency of occurrence for generating first and second output signals differing in phase by 180° and each having the first frequency and a linearly changing waveform, and responsive to the second and first signals, respectively, and a third signal having a first reference level for regulating the maximum level and rate of change of the linearly changing waveforms of the first and second output signals, respectively, said apparatus comprising:

a. first means responsive to the first signal for detecting the instantaneous level of the linearly changing waveform of the second output signal;

b. second means responsive to the second signal for detecting the instantaneous level of the linearly changing waveform of the first output signal;

c. third means responsive to the detected instantaneous levels of the first and second output signals and the first reference level of the reference signal for producing a control signal having a control level related to the instantaneous levels of the first and second output signals and the first reference level of the reference signal;

d. fourth means for storing the control level of the control signal during the successive periods of occurrence of the first and second signals;

e. fifth means responsive to the control signal and the first signal for integrating the control level of the control signal during the periods between successive occurrences of the first signal and for producing the first output signal having a linear rate of change related to the control level of the control signal and a maximum level related to the first reference level; and f. sixth means responsive to the control signal and the second signal for integrating the control level of the control signal during the period between successive occurrences of the second signal and for producing the second output signal having a linear rate of change related to the control level of the control signal and a maximum level related to the first reference level.

11. The apparatus of claim 10 wherein the fifth means further comprises means responsive to the first signal for adjusting the level of the first output signal to a second reference level, whereby the waveform of the first output signal linearly changes in response to the control level of the control signal from the second reference level to the maximum level in the period between successive occurrences of the first signal; and said sixth means further comprises means responsive to the second signal for adjusting the level of the second output signal to the second reference level, whereby the waveform of the second output signal linearly changes in response to the control level of the control signal from the second reference level to the maximum level in the period between successive occurrences of the second signal.

12. The apparatus of claim 11 wherein the first and second output signals have linearly changing sawtooth waveforms that are 180° out-of-phase with respect to each other.

13. The apparatus of claim 12 wherein said fifth and sixth means each further comprise:

a. a signal inverting operational amplifier having an input terminal and an output terminal;

b. an integrating capacitor coupled to said input and output terminals and adapted to integrate the control level of the control signal applied to said input terminal, and inverted by said operational amplifier, over the respective periods between successive occurrences of the first and second signals; and c. a reset gate including a reset input terminal and having a predetermined signal conductive path coupled between said input terminal and said output terminal, whereby each occurrence of the first and second signals applied to the reset input terminals of said fifth and sixth means, respectively, renders said reset gate signal conductive path operative to discharge the respective integrating capacitor and to reset the waveforms of the respective first and second output signals developed at said output terminals to said second reference level.

14. Signal generating apparatus for deriving a scanning signal having an irregular sawtooth waveform for application to scanning apparatus for scanning the image frames of continuously moving information bearing media having a plurality of successive image frames disposed thereon, in response to a first signal having a first frequency of occurrence related to the rate of movement of the image frames with respect to said scanning apparatus and a second signal having a second frequency of occurrence related to the scanning rate of the scanning apparatus, said signal generating apparatus comprising:

a. means responsive to the first signal for producing third and fourth signals differing in phase by 180° and each having a third frequency related to the first frequency of the first signal as a submultiple thereof;

b. means responsive to the third and fourth signals for generating first and second output signals, respectively, each output signal having the third frequency and a linearly changing sawtooth waveform;

c. first means responsive to the fourth signal for detecting the instantaneous level of the linearly changing sawtooth waveform of the third signal;

d. second means responsive to the third signal for detecting the instantaneous level of the linearly changing sawtooth waveform of the second output signal;

e. means for establishing a reference signal having a reference level;

f. means responsive to the reference level of the reference signal and the detected instantaneous levels of the first and second output signals for producing a control signal having a control level related to the instantaneous levels of the first and second output signals and the reference level of the reference signal;

g. means responsive to the control level of the control signal for regulating the rate of change of the waveforms of the first and second output signals;

h. means responsive to the second signals for producing a third output signal having the second frequency and a linearly changing sawtooth waveform, the third output signal having a maximum level related to said reference level of the reference signal; and i. switching means responsive to each occurrence of the second signal that succeeds, in time, each occurrence of the third and fourth signals for combining complementary periods of the first and second output signals with the third output signal to produce the scanning signal having an irregular sawtooth waveform.

15. The apparatus of claim 14 wherein said switching means further comprises:

a. means operative in a first or a second state, responsive to each occurrence of the second signal that succeeds, in time, each occurrence of the first signal for changing the operative state and for producing first and second switching signals, respectively, having respective complementary periods equal to the periods of said first and second states;

b. first and second non-polar switches each having a gate input adapted to receive the first and second switching signals, respectively, first and second signal inputs adapted to receive the first and second output signals, respectively, and a common output terminal, said first and second non-polar switches being responsive to the first and second complementary switching signals for passing respective complementary periods of the first and second output signals to said output terminal; and c. means for combining the complementary periods of the first and second output signals at said output terminal with the third output signal to produce the scanning signal having a frequency equal to said second frequency and an irregular sawtooth waveform.

* * * * *